F. J. ZIPPLER.
FURNACE.
APPLICATION FILED JUNE 18, 1914.
1,147,475.
Patented July 20, 1915
4 SHEETS—SHEET 1.
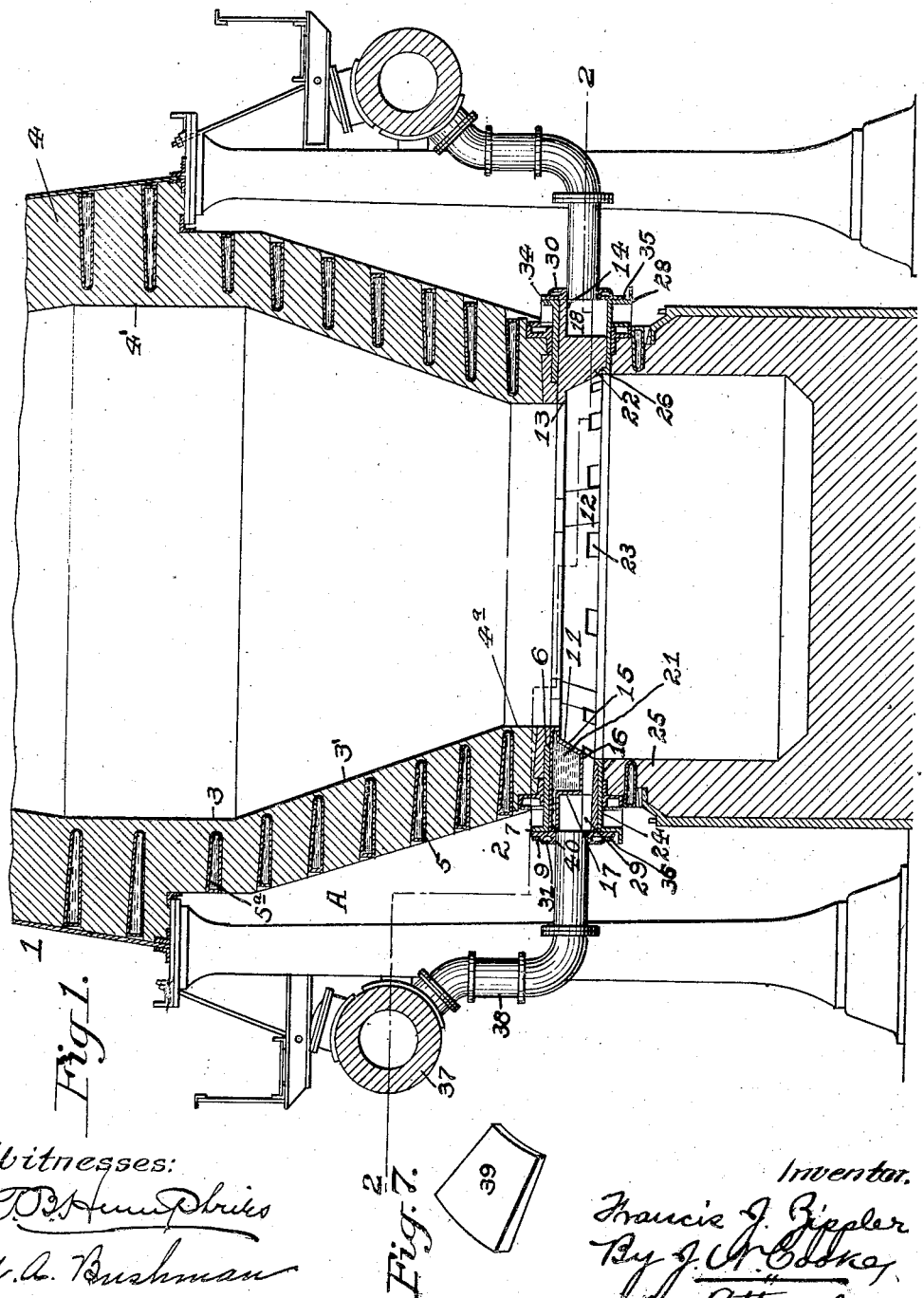

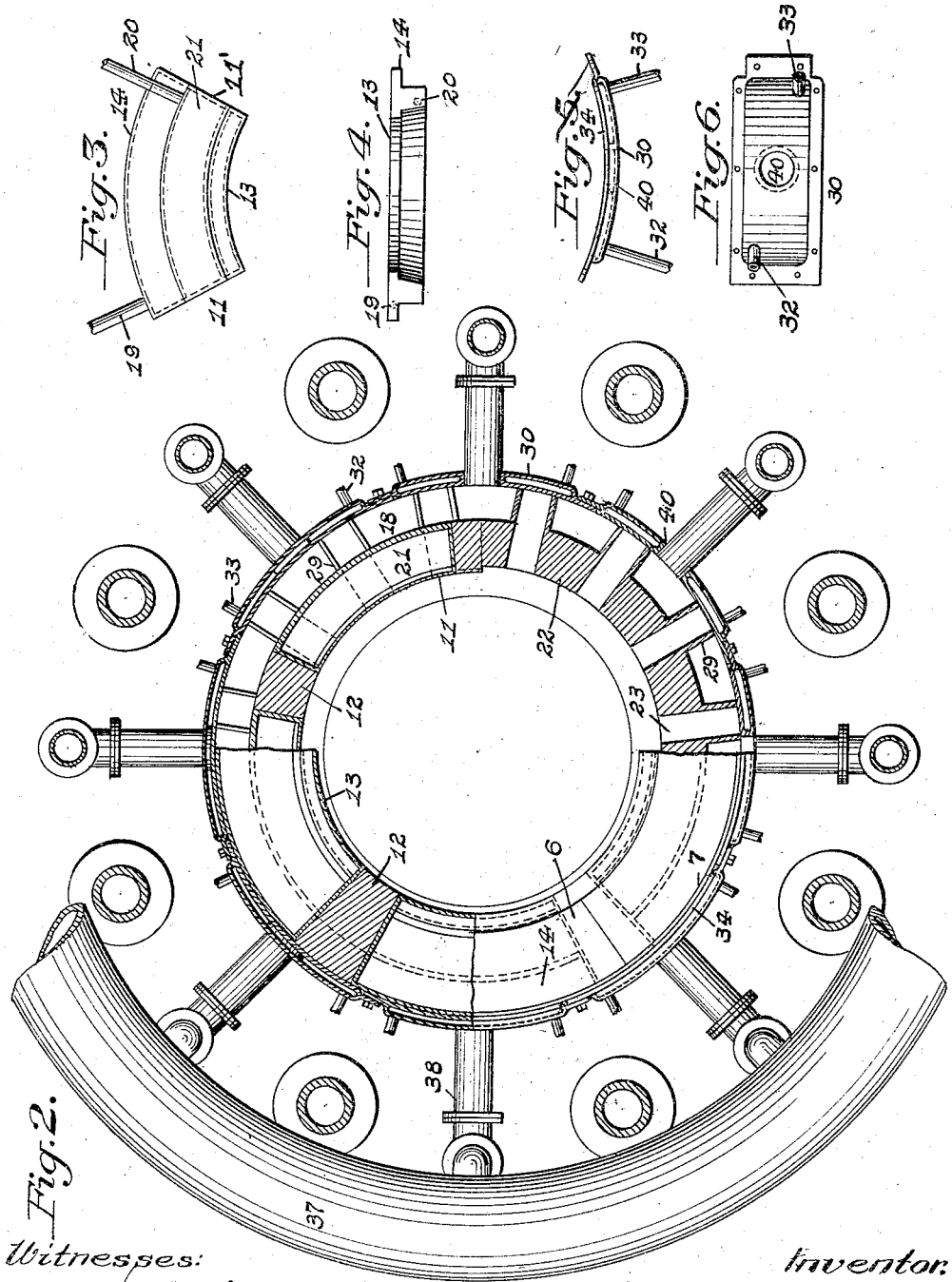

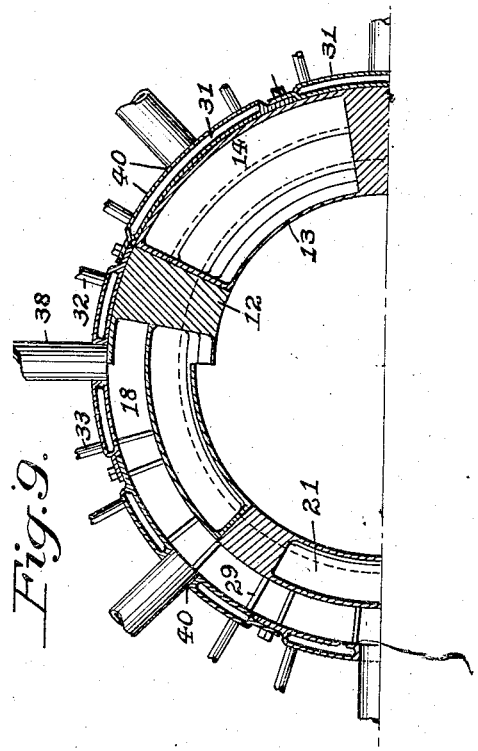
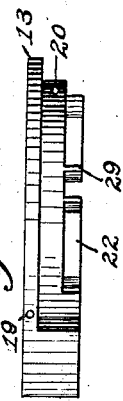
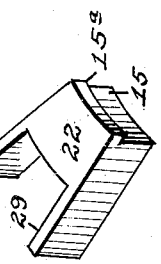
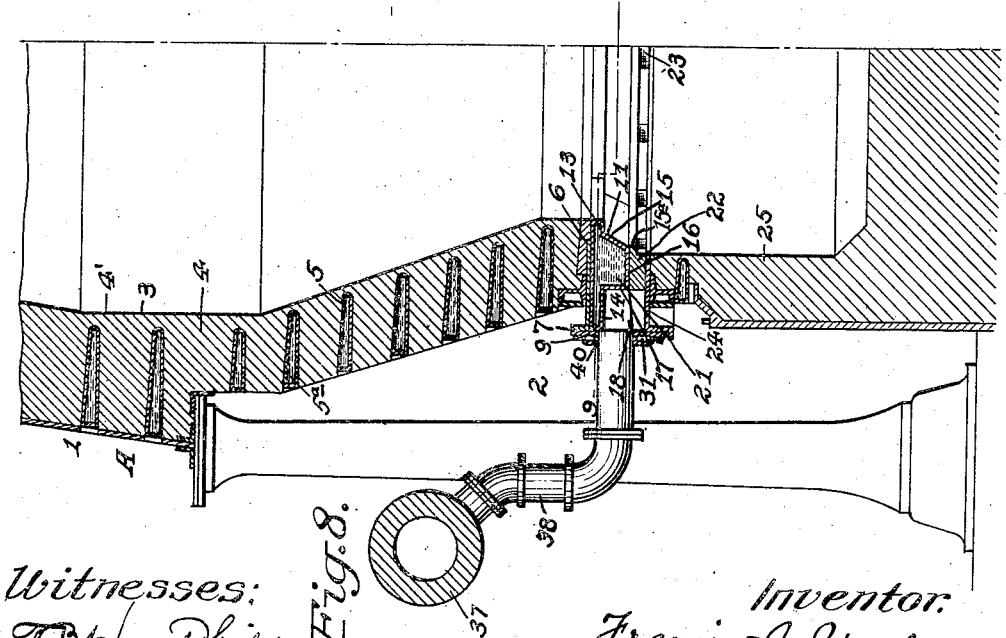

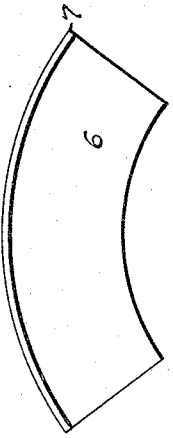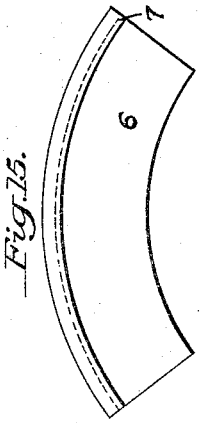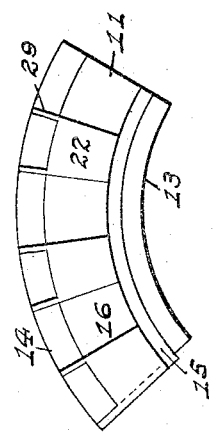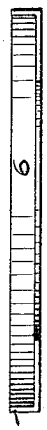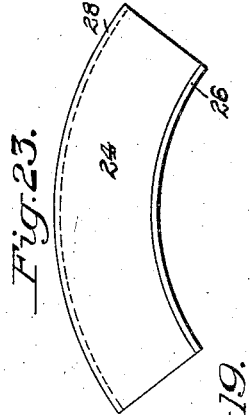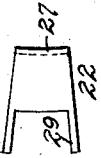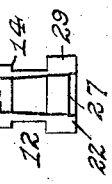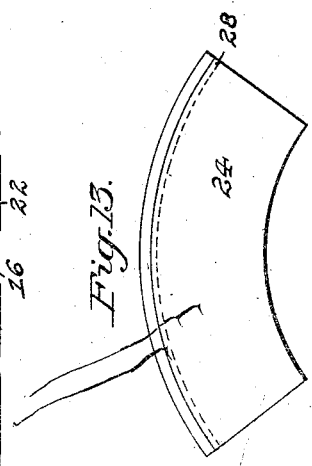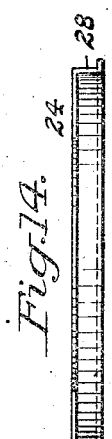

# UNITED STATES PATENT OFFICE.

FRANCIS J. ZIPPLER, OF AVALON, PENNSYLVANIA.

FURNACE.

1,147,475.  Specification of Letters Patent.  Patented July 20, 1915.

Application filed June 18, 1914. Serial No. 845,884.

*To all whom it may concern:*

Be it known that I, FRANCIS J. ZIPPLER, a citizen of the United States, and a resident of Avalon, in the county of Allegheny and State of Pennsylvania, have invented a new and useful Improvement in Furnaces; and I do hereby declare the following to be a full, clear, and exact description thereof.

My invention relates to furnaces and particularly to furnaces wherein the twyers of the same are surrounded by water cooled jackets to prevent the same from becoming overheated and burning out.

The object of my invention is to provide a cheap, simple and efficient form of furnace wherein the weight of the walls above the water jacket in the twyer section of the furnace will be supported by solid sections formed either integral with or separate from the twyer blocks and water jackets.

A further object of my invention is to provide a furnace wherein the band running around the twyer section will be formed in hollow sections so that water may be circulated through the same in order to keep them cool at all times.

Still another object of my invention is to provide a furnace wherein the blast chambers will be so arranged as to baffle the blast before it enters the furnace through the twyers and thus produce greater volume with a reduction in the force of the same.

My invention consists, generally stated, in the novel arrangement, construction and combination of parts as hereinafter more specifically set forth and described and particularly pointed out in the claims.

To enable others skilled in the art to which my invention appertains to construct, use, and operate my improved blast furnace I will describe the same more fully referring to the accompanying drawing in which:—

Figure 1 is a vertical sectional view of the lower part of a blast furnace showing my improvements embodied therein. Fig. 2 is a cross-sectional view on the line 2—2 of Fig. 1. Fig. 3 is a bottom plan view of a segment of the water jacket employed. Fig. 4 is a front view of the same. Fig. 5 is a top plan view of a segment of the band. Fig. 6 is a side view of the same. Fig. 7 is a perspective view of the insert placed in the twyers between the twyer blocks. Fig. 8 is a partial sectional view of a blast furnace showing a modification of my invention embodied therein. Fig. 9 is a sectional view of the same on the line 9—9 of Fig. 8. Fig. 10 is an outer end view of the combination twyer blocks and water jacket employed. Fig. 10$^a$ is a perspective view of the block shown in Fig. 8. Fig. 11 is a bottom plan view of the block shown in Fig. 10. Fig. 12 is a front view of the same. Fig. 13 is a top plan view of one form of the lower plate used below the twyer blocks and inserts. Fig. 14 is a front view of the same. Fig. 15 is a top plan view of one form of the upper plate used above the water jacket. Fig. 16 is a front view of the same. Figs. 17 and 18 are top plan and front views respectively of one of the solid supporting sections employed. Figs. 19 and 20 are top plan and front views respectively of the twyer block. Figs. 21 and 22 are top plan and front views respectively of another form of upper plate segment. Figs. 23 and 24 are top plan and front views respectively of another form of lower plate segment.

Like symbols of reference herein indicate like parts in each of the figures of the drawing.

As illustrated in the drawing 1 represents the upper portion and 2 the bosh of the blast furnace A, which bosh is provided with a lining or wall 3 having the downwardly and inwardly inclined surface 3' extending from the vertical portion 4' of the wall 4 and to the vertical portion 4$^a$ below said inclined surface. These walls or linings are formed of the usual built-up fire brick construction and have the bosh plates 5 within the wall 3 of the same, and these bosh plates are of hollow construction in order to provide chambers 5$^a$ through which cool water is adapted to circulate. Fitting under the vertical portion 4$^a$ of the wall 4 is a metal plate 6 which is preferably cast to shape and such plate has an upwardly extending flange 7 which is provided with suitable holes for receiving bolts 9 which secure the band in place as later described. This plate 6 is formed in segments and rests upon the water jacket 11 and said segments are so spaced as to cause the abutting end of the same to rest upon solid supporting sections 12 as hereinafter described. The water jacket 11 is formed in segments 11' and preferably of cast metal such as steel, while such jacket has the inner flange 13 of its segments so formed as to coincide with the vertical portion 4ª of the wall 4 and the outer flange 14 of its sections so formed as to coincide with the flange 7 on the plate 6 and the outer face of the wall 4. At a short distance to the rear of the inner flange 13 is the inner face 15 which is tapered outwardly in the direction of the bottom 16 of the segment 11' while the outer face 17 of said segment is located a short distance in front of the outer flange 14 so as to provide a space or chamber 18 between the said outer face and the band 30. The water jacket segments 11' are hollow and are provided with an inlet pipe 19 and an outlet pipe 20 for respectively admitting cold water to the hollow interior 21 of said segments and for withdrawing the same from said hollow interior after it has become heated. The water jacket segments 11' are adapted to rest upon twyer blocks 22 and said blocks are adapted to be equally spaced around the circumference of the furnace and a short distance apart in order to form twyers 23 for the admission of blast to the interior of the furnace. Every third block 22 has a solid supporting section 12 formed integrally therewith in order to provide portions for the support of the abutting ends of the segments of the plate 6 and said supporting sections have a cross sectional area conforming to the cross sectional area of the water jacket 11 and twyer blocks 22 except that said supporting sections are solid. Beneath the twyer blocks 22 is a plate 24 which is formed in segments and rests upon the lower wall 25 of the furnace bosh 2 and such plate has an upwardly extending inner flange 26 which fits against the shoulder 27 on the twyer blocks 22 and said shoulder is provided with a downwardly extending outer flange 28 the purpose of which is later explained.

The twyer blocks 22 have their front faces coinciding with the lower end of the inner face 15 of the water jacket 11 and such face may be tapered downwardly and outwardly as shown in Fig. 1 or may be provided with the small flange 15ª as shown in Figs. 8 and 10ª and such blocks have their outer ends coinciding with the outer face 17 of said section while at each side of said block a partition or wing 29 extends to the band 30.

The band 30 is formed in segments 30' and each of said segments has a hollow interior 31 for the purpose of permitting the circulation of water in the same through the inlet pipe 32 and outlet pipe 33 while such band is provided with a flange 34 at the upper end of the same for being bolted to the flange 7 of the metal plate 6 by means of the bolts 9. The bend is also provided with a lower flange 35 for being bolted to the downwardly extending outer flange 28 of the lower plate 24 by means of bolts 36.

The water for the water jacket 11 and the hollow band 30 is supplied from any suitable source while the blast is admitted from the main air pipe or bustle 37 which is connected in the usual manner to the usual supply engine and such bustle has the pipes 38 leading therefrom into the annular chamber 18 at equal distances around the periphery of the furnace.

Fig. 8 shows a modified view of the furnace with the water jacket, solid supporting sections, and twyer blocks formed integral with each other and if desired the water jacket may be formed integral with either the twyer blocks or solid supporting sections and the other ones left separate.

The air supply pipes 38 leading into the annular blast chamber 18 supply hot blast thereto and the twyer blocks 22 are so located that the blast from said pipes strikes said blocks and twyers in different positions so that said blast is thereby confused and forced through said twyers in greater volume but with less force than if said supply pipes were directly in line with said twyer openings.

Between each of the twyer blocks 22 below the water jacket 11 is an insert 39 which is tapered throughout its width and the thick outer side of the same rests against the band 30 while the thin inner end is adapted to rest against the flange 26 on the plate 24 in order to hold the same in position. This insert is for the purpose of preventing any of the molten metal in the furnace from running back into the twyers and into the supply pipes so that when it becomes cold it would clog up the same, whereas with the use of the insert, as the metal is tapped from the furnace, the molten metal will run down the inclined face of the insert and thus leave the twyer open and free from any hardened metal or slag.

In the operation of my improved furnace the hot blast is furnished to the supply pipes 38 from the bustle 37 and said supply pipes are located at equal distances around the twyer belt and enter the same through the openings 40 in the band segments 30. On account of the number of supply pipes being different than the number of twyer openings, said twyer openings will practically be staggered to the openings from said pipe, and the blast in entering the annular chamber 18 will strike against the outer face 17 of the water jacket 11 and thus the force of the same will be reduced while each twyer will draw its own supply from the chamber 18 between the partitions 29 on the respective twyer blocks 22. As these partitions 29 extend to the band 30 any blast entering the same must either do so directly from the supply pipes 38 or pass between the wings or partitions 29 of the respective twyer blocks 22 from the annular chamber 18 above the same.

It will thus be seen that with the use of my improved furnace the hot blast will be completely baffled before entering the interior of the furnace and this will tend to decrease the force of the same while at the same time increasing the volume. It will also be seen that in the use of my improved furnace the entire twyer belt will be kept cool by the water jacket 11 and the hollow water-filled band 30 passing around the entire twyer belt.

It will be evident that with the use of the insert 39 in the twyers 23 the molten metal will be prevented from lying within the same and flanges 26 on the plate 24 will prevent the twyer blocks 22 and said inserts from becoming dislocated. It will also be seen that the twyer blocks 22 may be made hollow in order to permit of water being circulated through the same in the same manner that the water is circulated through the water jacket segments 11' and the band segments 30. It will further be apparent that with the use of my improved furnace any segment 11' of the water jacket 11 can be removed from the furnace in case the same becomes cracked or broken and this is accomplished by simply removing one or more of the sections of the band 30 whereupon a new water jacket segment may be placed in the twyer belt of the furnace and the band segments replaced without any great loss of time or any tearing down or destruction of parts or any of the walls of the furnace. It will further be seen that with the use of the solid sections for supporting the walls of the furnace upon the plate 6, the weight of said walls will be removed from the water jacket 11, and thus the danger of the same being broken by this great weight will be greatly reduced.

Various modifications and changes in the design, and construction of my improved furnace may be resorted to without departing from the spirit of the invention or sacrificing any of its advantages.

What I claim as my invention and desire to secure by Letters Patent is:—

1. A furnace having a twyer section comprising a blast chamber communicating with blast supply pipes, twyer blocks forming twyers between the same, and means extending to the rear of said chamber to permit each twyer to draw its supply directly from said chamber.

2. A furnace having a twyer section comprising a blast chamber communicating with blast supply pipes, twyer blocks forming twyers between the same, and wings extending to the rear of said chamber to permit each twyer to draw its supply directly from said chamber.

3. A furnace having a twyer section comprising a water jacket, a blast chamber communicating with blast supply pipes so located as to force said blast against said water jacket to break the force of the same and scatter it in said chamber, twyer blocks forming twyers between the same, and means on said twyer blocks extending to the rear of said chamber to permit each twyer to draw its supply directly from said chamber.

4. A furnace having a twyer section comprising a water jacket, a blast chamber communicating with blast supply pipes so located as to force said blast against said water jacket to break the force of the same and scatter it in said chamber, twyer blocks forming twyers between the same, and wings on said twyer blocks extending to the rear of said chamber to permit each twyer to draw its supply directly from said chamber.

5. A furnace having a twyer section comprising an annular blast chamber communicating with blast supply pipes, twyers communicating with said chamber and leading into said furnace, a segmental water jacket above said twyers, and means between said segments for supporting the walls of said furnace.

6. A furnace having a twyer section comprising an annular blast chamber communicating with blast supply pipes, twyers communicating with said chamber and leading into said furnace, a segmental water jacket above said twyers, and solid sections between said segments for supporting the walls of said furnace.

7. A furnace having a twyer section comprising an annular blast chamber communicating with blast supply pipes, twyers communicating with said chamber and leading into said furnace, a segmental water jacket above said twyers, a segmental plate above said water jacket, and means between said water jacket segments for supporting the walls of said furnace upon said plate.

8. A furnace having a twyer section comprising an annular blast chamber communicating with blast supply pipes, twyers communicating with said chamber and leading into said furnace, a segmental water jacket above said twyers, a segmental plate above said water jacket, and solid sections between said water jacket segments for supporting the walls of said furnace upon said plate.

9. A furnace having a twyer section comprising an annular blast chamber communicating with blast supply pipes, twyers communicating with said chamber and leading into said furnace, a segmental water jacket above said twyers, a segmental plate above said water jacket, and means between said water jacket segments forming supports for the abutting ends of said plate segments for supporting the walls of said furnace.

10. A furnace having a twyer section comprising an annular blast chamber communicating with blast supply pipes, twyers communicating with said chamber and leading into said furnace, a segmental water jacket above said twyers, a segmental plate above said water jacket, and solid sections between said water jacket segments forming supports for the abutting ends of said plate segments for supporting the walls of the furnace.

11. A furnace having a twyer section comprising an annular blast chamber communicating with blast supply pipes, twyers communicating with said chamber and leading into said chamber, said twyers being formed by twyer blocks in said section, a segmental water jacket above said twyers, a segmental plate above said water jacket, and means conforming to the shape of said water jacket and twyer block between said water jacket segments forming supports for the abutting ends of said plate segments for supporting the walls of said furnace.

12. A furnace having a twyer section comprising an annular blast chamber communicating with blast supply pipes, twyers communicating with said chamber and leading into said chamber, said twyers being formed by twyer blocks in said section, a segmental water jacket above said twyers, a segmental plate above said water jacket, and solid sections conforming to the shape of said water jacket and twyer block between said water jacket segments forming supports for the abutting ends of said plate segments for supporting the walls of said furnace.

13. A furnace having a twyer section comprising an annular blast chamber formed by a segmental water jacket and a band around said section, said band being hollow for the circulation of a cooling fluid through the same.

14. A furnace having a twyer section comprising an annular blast chamber formed by a segmental water jacket and a band around said section, said band being hollow for the circulation of a cooling fluid through the same and formed in segments to permit of the removal of said water jacket segments.

15. A furnace having a twyer section comprising an annular blast chamber formed by a segmental water jacket and a band around said section, said band being hollow for the circulation of a cooling fluid through the same, and solid sections between said segments for supporting the walls of said furnace.

16. A furnace having a twyer section comprising an annular blast chamber formed by a segmental water jacket and a band around said section, said band being hollow for the circulation of a cooling fluid through the same and formed in segments to permit of the removal of said water jacket segments, and solid sections between said segments for supporting the walls of said furnace.

17. A furnace having a twyer section comprising an annular blast chamber formed by a segmental water jacket and a band around said section, said band being hollow for the circulation of a cooling fluid through the same, a segmental plate above said water jacket, and solid supporting sections between said water jacket segments for supporting the walls of said furnace upon said plate.

18. A furnace having a twyer section comprising an annular blast chamber formed by a segmental water jacket and a band around said section, said band being hollow for the circulation of a cooling fluid through the same, and formed in segments to permit of the removal of said water jacket segments, a segmental plate above said water jacket, and solid supporting sections between said water jacket segments for supporting the walls of said furnace upon said plate.

19. A furnace having a twyer section comprising a blast chamber within the walls of the furnace and communicating with blast supply pipes, twyer blocks forming twyers between the same, and means extending to the rear of said chamber to permit each twyer to draw its supply of blast directly from said chamber.

20. A furnace having a twyer section comprising a blast chamber within the walls of the furnace and communicating with blast supply pipes, twyer blocks forming twyers between the same, and wings extending to the rear of said chamber to permit each twyer to draw its supply of blast directly from said chamber.

21. A furnace having a twyer section comprising a blast chamber communicating with blast supply pipes, twyers, and means extending to the rear of said chamber to permit each twyer to draw its supply of blast directly from said chamber.

22. A furnace having a twyer section comprising a blast chamber communicating with blast supply pipes, twyers, and wings extending to the rear of said chamber to permit each twyer to draw its supply of blast directly from said chamber.

23. A furnace having a twyer section, comprising an annular blast chamber within the wall of the same communicating with a blast supply, and twyer blocks forming twyers between the same and leading into said furnace, said twyer blocks being provided with an overhanging portion on their inner faces.

24. A furnace having a twyer section, comprising an annular blast chamber within the wall of the same communicating with a blast supply, and twyer blocks forming twyers between the same and leading into said furnace, said twyer blocks having their inner faces flaring to form overhanging portions thereon.

In testimony whereof, I the said FRANCIS J. ZIPPLER have hereunto set my hand.

FRANCIS J. ZIPPLER.

Witnesses:
T. B. HUMPHRIES,
J. N. COOKE.

Copies of this patent may be obtained for five cents each, by addressing the "Commissioner of Patents, Washington, D. C."